(12) United States Patent
Sattler et al.

(10) Patent No.: US 7,797,354 B2
(45) Date of Patent: Sep. 14, 2010

(54) METHOD AND SYSTEM FOR MANAGING DOCUMENTS FOR SOFTWARE APPLICATIONS

(75) Inventors: Juergen Sattler, Wiesloch (DE); Joachim Gaffga, Wiesloch (DE)

(73) Assignee: SAP AG, Walldorf (DE)

( * ) Notice: Subject to any disclaimer, the term of this patent is extended or adjusted under 35 U.S.C. 154(b) by 1204 days.

(21) Appl. No.: 11/026,052

(22) Filed: Jan. 3, 2005

(65) Prior Publication Data

US 2006/0010148 A1    Jan. 12, 2006

Related U.S. Application Data

(60) Provisional application No. 60/586,279, filed on Jul. 9, 2004.

(51) Int. Cl.
G06F 17/30 (2006.01)
G06F 17/00 (2006.01)

(52) U.S. Cl. .................................................. 707/809

(58) Field of Classification Search ................. 707/205; 715/522; 719/328
See application file for complete search history.

(56) References Cited

U.S. PATENT DOCUMENTS

| | | | |
|---|---|---|---|
| 7,036,072 B1* | 4/2006 | Sulistio et al. | 715/517 |
| 2001/0054046 A1* | 12/2001 | Mikhailov et al. | 707/500 |
| 2002/0188638 A1* | 12/2002 | Hamscher | 707/530 |
| 2004/0010796 A1* | 1/2004 | Paul et al. | 719/328 |
| 2004/0017583 A1* | 1/2004 | Kageyama et al. | 358/1.15 |
| 2004/0193596 A1* | 9/2004 | Defelice et al. | 707/5 |
| 2005/0010458 A1* | 1/2005 | Holloway et al. | 705/7 |
| 2005/0097462 A1* | 5/2005 | Lumera et al. | 715/522 |
| 2006/0004699 A1* | 1/2006 | Lehikoinen et al. | 707/2 |

* cited by examiner

*Primary Examiner*—Tony Mahmoudi
*Assistant Examiner*—Michele C Choi
(74) *Attorney, Agent, or Firm*—Kenyon & Kenyon LLP

(57) ABSTRACT

A method and system for integrating software application program documents is provided. A request to save documents in an document managements system may be received from application programs, with each document in a format native to the application program that requests that the document be saved. Text data may be extracted from the documents to be saved and converted into a converted data file that is in a common format that is not specific to any application program. The converted data files may then be stored in a memory.

23 Claims, 4 Drawing Sheets

METHOD AND SYSTEM FOR MANAGING DOCUMENTS FOR SOFTWARE APPLICATIONS

CROSS-REFERENCE TO RELATED APPLICATIONS

This application claims the benefit for purposes of priority to U.S. application Ser. No. 60/586,279, filed Jul. 9, 2004.

BACKGROUND

Software application programs often store documents as data files in a format that is native to the application. For example, Microsoft Word® stores .doc files, Corel WordPerfect® stores .wpd files, and Adobe Acrobat stores .pdf files. When a first program tries to access a data file of a second program, the first program must be able to access the file format of the second program. In most instances, the first program either cannot access the file type at all or must first perform extensive file conversion to the first program's native format, particularly when the application programs are from different vendors. Such inaccessibility issues can occur even with different versions of the same application program.

Adding new applications or upgrading existing applications may be time-consuming and costly if every application is reconfigured to include routines, e.g., format conversion, to access the new or upgraded application. To avoid these problems, there is a need in the art for a stable and consistent system that supports interoperability between different application programs residing therein.

DETAILED DESCRIPTION OF EMBODIMENTS

Embodiments of the present invention include a bidirectional abstraction layer that supports interoperability between different software application programs ("software" or "applications") residing in a computer system. The abstraction layer advantageously allows a developer to upgrade and add new application programs so that such programs efficiently operate with documents created by other application programs in the system, without reconfiguring the programs. It may be understood that the examples discussed below are for illustration purposes only and are not intended to limit the configuration to that shown.

Figure 1:
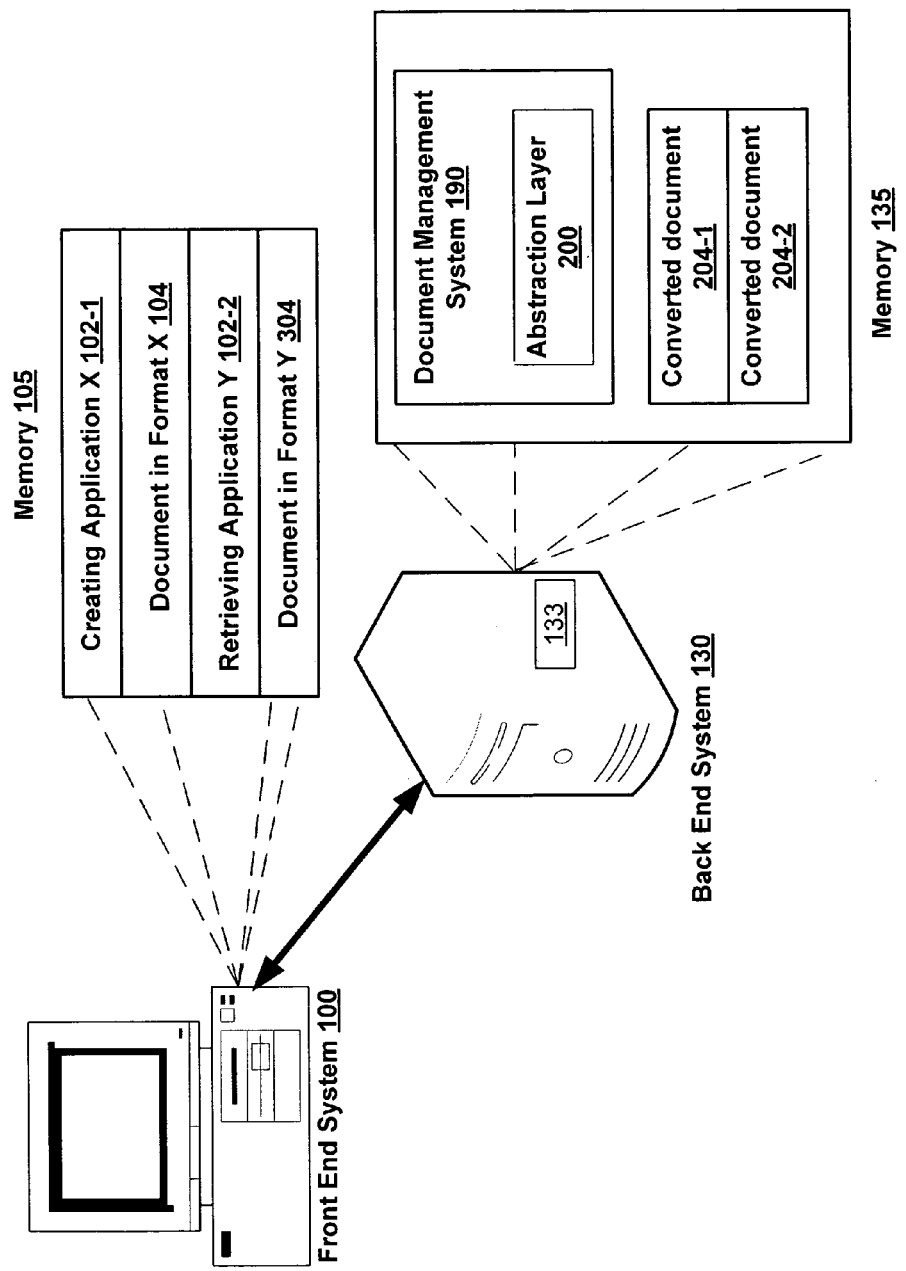
FIG. 1 is a simplified block diagram that shows an example of a computer system on which to execute an embodiment of the present invention.

FIG. 1 is a simplified block diagram that shows an example of a computer system on which to execute an embodiment of the present invention. In this example, front end system 100 is coupled to back end system 130. Front end system 100 may be a personal computer or terminal, a personal digital assistant, or some other computer device capable of executing application programs. As shown in FIG. 1, front end system includes memory 105, in which a creating application program X 102-1, a retrieving application program Y 102-2, a document in format X 104, and a document in format Y 304 are stored. Creating application program X 102-1 and retrieving application program Y 102-2 may be any types of application programs, such as a word processor program, spreadsheet program, database program, etc. For example, creating application program X 102-1 may be Microsoft Word® and retrieving application program Y 102-2 may be Corel WordPerfect®. As another example, creating application program X 102-1 and retrieving application program Y 102-2 may be different versions of the same application program (e.g., different versions of Microsoft Word®).

In the example shown, creating application program X 102-1 is referred to as a "creating application" because it creates a document, and retrieving application program Y 102-2 is referred to as a "retrieving application" because it requests the retrieval of a document that was previously created. The creating application may be considered to be the owner of the document. In embodiments of the present invention, any particular application may be a creating application and/or a retrieving application. Document in format X 104 has been created by creating application program X 102-1 and may be a file of type .doc, .pdf, .wpd, and the like. In the example shown, document in format Y 304 corresponds to document 104 but in a different application format. As used herein, a document is a data file that contains data for an application program. A format is native to an application if that application defaults to storing data in that format. Many applications use document formats that are specific to that application. A format may be vendor specific, in which case it is specific to a particular vendor, or vendor proprietary. Thus, different versions of the same application by the same vendor may have different native formats. For example, Microsoft Word 97® may have a different native format than Microsoft Word 2003®.

Back end system 130 may be a server or a group of servers that perform operations for front end system 100, such as file storage, etc. In embodiments, back end system 130 may be implemented as separate components, and parts of the functionality may be performed on components residing on different networks. Typically, a plurality of front end systems 100 would be coupled to and serviced by back end system 130. As shown in FIG. 1, back end system 130 includes a processor 133 and a memory 135, in which a document management system 190, abstraction layer 200, and converted documents 204-1 and 204-2 are stored. Memory 135 may be a machine readable medium that is capable of being read by a machine, such as a compact disk, hard drive memory, floppy disk memory, DVD-ROM, CD-ROM or any type of machine-readable (computer-readable) storing medium. Instructions stored on memory 135 may be included within a computer program (which as is well known comprises a plurality of instructions) that is executable by a processor. As used herein, a document management system 190 is an application program that organizes stored documents, such as the MailSite SE™, DM5™, KnowledgeBase.net, etc. In some embodiments, document management system 190 and abstraction layer 200 are both executed by a processor in back end system 130. In other embodiments, abstraction layer 200 and converted documents 104 reside on a different server than document management system 190, and may be coupled to document management system 190 over a network such as the internet. Together, these components provide a method and system for integrating documents for applications 102, independent of their document formats.

Abstraction layer 200 may be considered to be an abstraction layer for documents stored by applications 102 and may include document conversion software routines to make the documents interoperable between applications 102. In some embodiments, applications at front end system 100 may send a request (command) to document management system 190 such as a request to save a document or a request to open a saved document. Upon receiving a request for document 104 to be saved, abstraction layer 200 may convert a document from a first format into a second, common format and may store the converted data into one or more converted documents. Alternatively, upon receiving a request for converted documents, abstraction layer 200 may convert converted documents 204 from the common format to a third format native to a retrieving application. A common format may be a format that is not specific to any application. It is to be understood that applications 102, document 104, abstraction layer 200, and converted documents 204 may reside on the same or different computers in a network.

Figure 2:
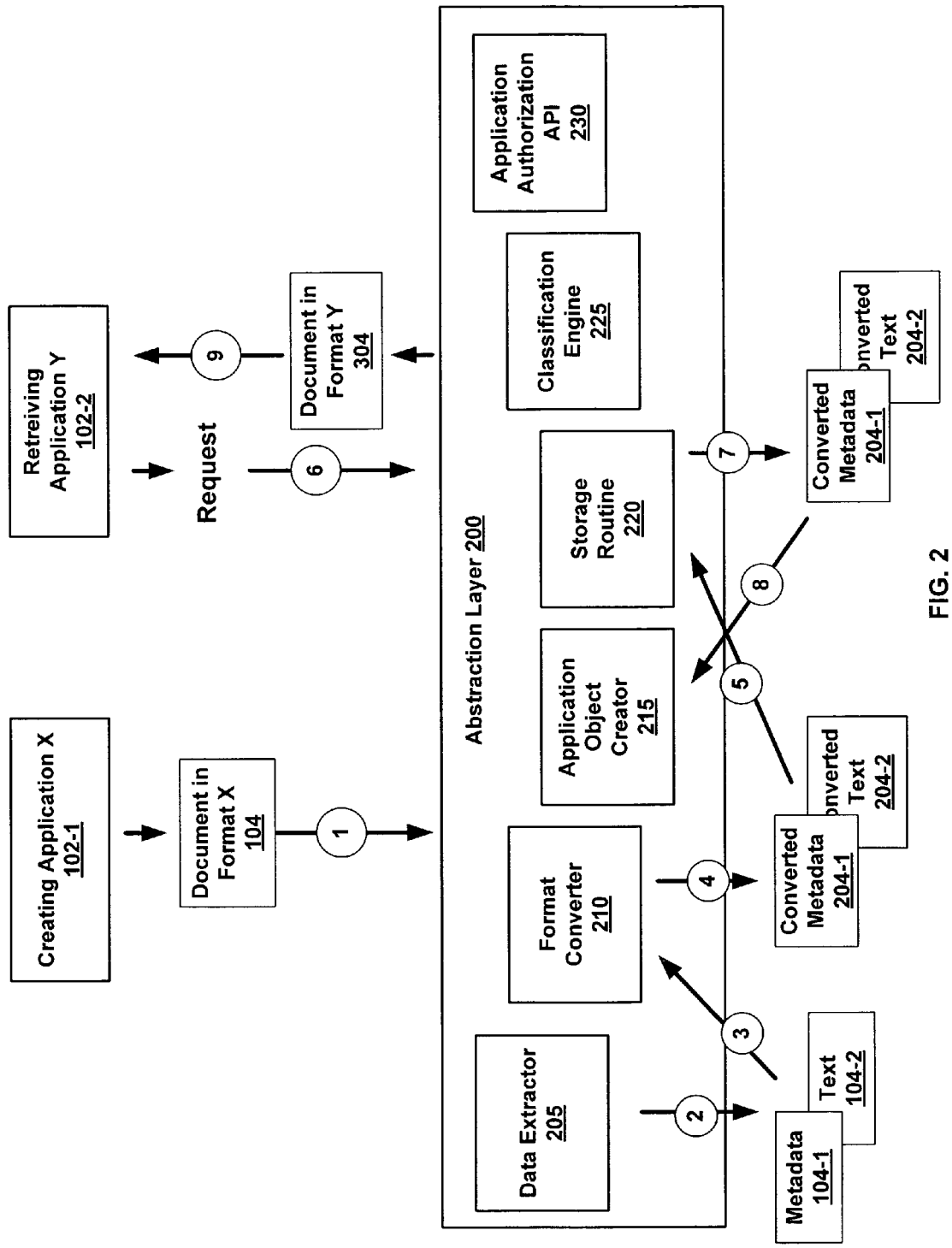
FIG. 2 is a simplified block diagram that shows an example of a software architecture and data files to implement an embodiment of the present invention.

FIG. 2 is a simplified block diagram that shows an example of the software architecture and data files to implement an embodiment of the present invention. This embodiment shows applications 102-1 and 102-2 and abstraction layer 200. Abstraction layer 200 includes a plurality of software components (or modules) for performing various functions on application documents to make them interoperable between different applications 102. Exemplary modules shown in FIG. 2 include data extractor 205, format converter 210, application object creator 215, storage routine 220, classification engine 225, and application authorization API 230. It is to be understood that abstraction layer 200 is not specific to those modules described herein, but may include more or less modules to perform embodiments of the present invention. Of course, one or more of these modules may be implemented as separate programs or as one or more groups of instructions executable by a processor. FIG. 2 also shows a series of reference numerals 1-9 which designate an example data flow and are discussed below in the context of FIGS. 3 and 4.

As noted above, each of the components in abstraction layer 200 may perform functions to implement the abstraction layer. Data extractor 205 may extract data from a document that is being stored by an application, such as document 104. In particular, data extractor 205 may extract information such as text, metadata, form fields, graphics, and any other data included in the document. For example, data extractor 205 may extract the text of a document in a word processor specific format as well as the metadata for that document, such as author, version, creation date, change date, etc. Of course, text may include numbers, letters, and other characters. Data extractor 205 may also extract form field data, which includes a list of the form fields in a form-type document, the form format, the values within the form fields, etc. Data extractor 205 may extract all or portions of document 104 and may send the extracted information, shown in this example as metadata 104-1 and text 104-2, to format converter 210. Data extractor 205 may also extract metadata from the document, and this extracted metadata may be stored in a common format.

Format converter 210 may convert the extracted data into a common format. A common format is one that is not specific to any particular vendor, application, or version thereof. Examples of common formats are the Extensible Markup Language (XML) or American Standard Code for Information Interchange (ASCII) formats. For example, format converter 210 may convert .doc files, .wpd files, xls files, .ppt files, etc. to the .xml format or the .asc format. Format converter 210 may also provide conversion for digital signatures and other like data associated with files. The converted data, shown in this example as metadata 204-1 and text 204-2, may be provided to storage routine 220.

In embodiments of the present invention, data is stored by abstraction layer 200 in a common format. Storage routine 220 may store converted data in a memory and may perform memory searches to quickly find requested data at a later time.

Classification engine 225 delivers content-dependent classifications (as an automatic process) to enrich metadata extracted by data extractor 205. Examples of such classifications, which are in addition to the metadata generated from the document itself, are "Specification", "Construction Drawing", "Reports", "Presentation", "Invoice", "Incoming Payment", "Appraisal", etc. Such classifications may be assigned to a document by a user and may generally be used by users who are requesting additional information about a document.

Upon receipt of a request for an application data file, the requested data file may be retrieved by storage routine 220, and application object creator 215 may convert the data file from a common format back into a format that is used by the retrieving application. Application object creator 215 may provide the contents of converted documents 204 back to retrieving application 102-2 after conversion from the common format to the application's recognized format. Application object creator may combine the components of the stored document (e.g., text, metadata, etc.) into a single virtual document that may be operated on by an application.

Application Authorization API (Application Program Interface) 230 may provide authorization checks to ensure that permissions are preserved in converted data as were set up when the document was first created. For example, if document in format X 104 was a read-only document, such that any other operations could only be performed by the owner of the document, and that document was stored as converted document 204, then access to converted document 204 should also be provided on a read-only basis. Such authorizations prevent an unauthorized user from accessing the data after it has been converted to the calling application's format.

Figure 3:
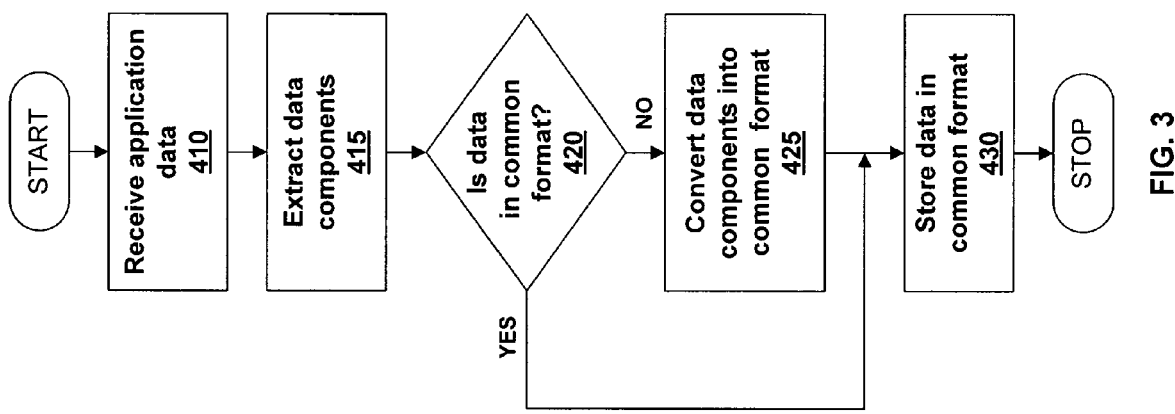
FIG. 3 is a flowchart of a method according to an embodiment of the present invention.

FIG. 3 is a flowchart of a method according to an embodiment of the present invention for converting data from an application format to a common format. In this method, abstraction layer 200 receives a data file from an application (410) and extracts the data components (415). Abstraction layer 200 may then determine whether the extracted data is in a common format (420). If so, abstraction layer 200 may store the data in a memory to await a request from any one of applications 102 (430). For example, as shown by reference (1) in FIG. 2, application 102-1 may create and send a command to save document 104 to document management system 190 (not shown in FIG. 2), which may send a request to save the document to abstraction layer 200. The data may be extracted from document 104 using data extractor 205. Data extractor 205 may separate the metadata in document 104 from the text and create two respective documents 104-1 and 104-2 (as shown by reference 2). If the data is in a common format, the data file may be stored on memory 135 in that common format.

If as shown in FIG. 3 the extracted data is not in a common format, abstraction layer 200 may convert the extracted data into a common format (425) and may store the converted data in memory 135 to await a request from any one of applications 102 (430). As shown in FIG. 2, data extractor 205 may send the extracted data files (reference 3) to format converter 210. Format converter 210 may convert the two data files into respective converted documents 204-1 and 204-2 (references 4-5), having a common format. Storage routine 220 may store the converted documents in memory 135.

Figure 4:
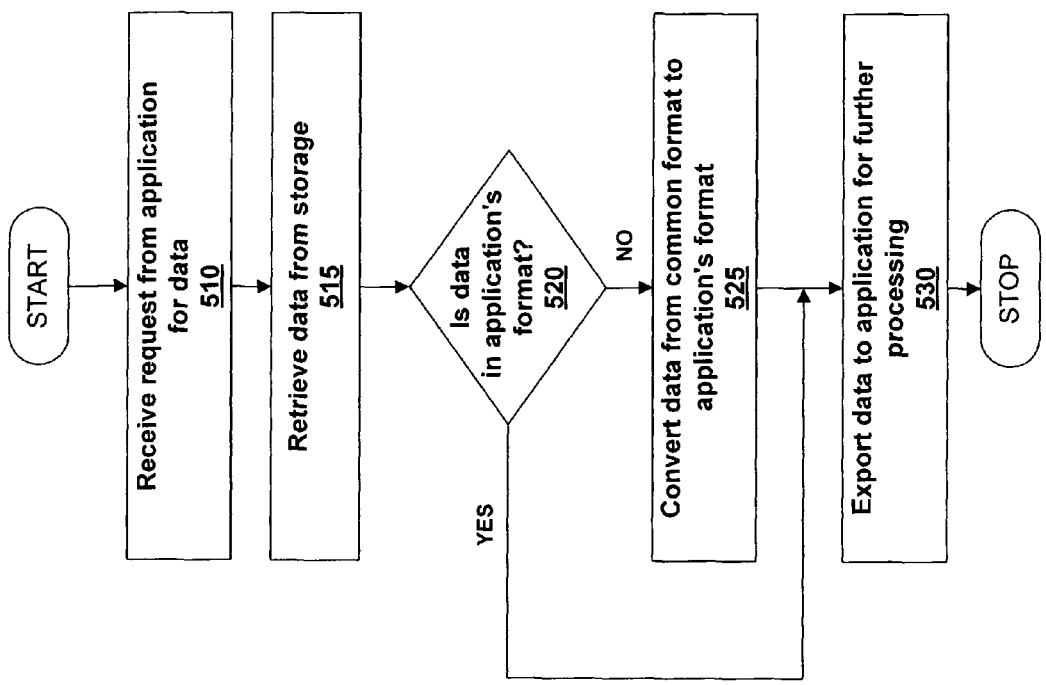
FIG. 4 is a flowchart of another method according to an embodiment of the present invention.

FIG. 4 is a flowchart of a method according to an embodiment of the present invention for converting data from a common format to a retrieving application's format. In this method, abstraction layer 200 receives a request for application data from a retrieving application (510) and retrieves the data in the common format from a memory (515). For example, as shown by reference 6 in FIG. 2, application 102-2 may send a request for document 104 to document management system 190 (not shown in FIG. 2), which may send a request to abstraction layer 200. Storage routine 220 may search and retrieve stored converted files 204-1 and 204-2 (reference 7) from memory 135 and may send the files (reference 8) to application object creator 215.

Abstraction layer 200 may then determine whether the retrieved data is in the retrieving application's format (520) (i.e., if the retrieving application uses the common format as its native format). If so, abstraction layer 200 may export the retrieved data (or a pointer to that data) to retrieving application 102-2 for further processing (530).

If the retrieved data is not in the retrieving application's format, abstraction layer 200 may convert the retrieved data from common format to the retrieving application's format (525) using application object creator 215. In an embodiment, the retrieved data may be separated into one or more converted data files 204. Therefore, application object creator 215 repeats the conversion for each converted data file 204. Abstraction layer 200 then combines the converted data into document 304 and exports (530) the document to a retrieving application for further processing. For example, as shown in FIG. 2, application object creator 215 may convert the data files from the common format to the format native to retrieving application 102-2 and combine the converted data into document 304. Application object creator 215 then may send document 304 (reference 9) to application 102-2 for further processing.

Classification engine 225 may also send content-dependent classifications to application 102-2 to be displayed to a user at front end system 100. Application authorization API 230 may attach the same permissions to document 304 as were in document 104. As such, if the user at front end system 100 is not authorized to view document 104, the user will also be prevented from viewing converted document 304.

In some embodiments of the present invention, when one of applications 102 is upgraded or a new application 102 is added to the computer system, the developer simply adds a plug-in or modifies abstraction layer 200 to include respective upgraded or new routines to make the upgraded or new applications interoperable with the existing applications. The software for the conversion module may be provided by the vendor of the new or upgraded application. The developer of the application need not modify the application itself, thereby advantageously saving the developer time and costs. For example, if a new application is to have its documents accessed through the abstraction layer, the developer of that application may provide a plug-in module that is used by data extractor 205, format converter 210 and/or application object creator 215 to extract data from documents in the native format of that application and convert the data back and forth into that native format.

In some embodiments, when a document is saved to or retrieved from the application layer, the application making that request or the document management system may specify the native format of the document. In some embodiments, the native format may be determined by the abstraction layer based on an identification of the application that is saving or requesting the document. Thus, the abstraction layer may be capable of communicating using the application program interface of each of the applications that store or request documents from the abstraction layer.

The above is a detailed discussion of the certain embodiments. It may be understood that the examples discussed are for illustration purposes only and are not intended to limit the configuration to that shown. It is of course intended that the scope of the claims may cover other embodiments than those described above and their equivalents.

What is claimed is:

1. A computer-implemented method comprising:
   at a document management system, responsive to a request from an application program to store a document, determining if the document is in a format of the document management system;
   extracting component data from the document; and
   if the document is not in the format of the document management system, then:
      converting the extracted component data via a plug-in that is specific to the application program into one or more converted component data files that are in the format of the document management system;
      converting access authorization information for the document via the plug-in into converted access authorization information that is in the format of the document management system;
      storing the converted component data files in a memory;
      storing the converted access authorization information in the memory.

2. The computer-implemented method of claim 1, wherein converting the extracted component data into the converted component data file comprises converting the component data from one of a .doc, .wpd, and .pdf format to a .xml format.

3. The computer-implemented method of claim 1, wherein the method further comprises:
   extracting metadata from the document;
   converting the extracted metadata into a converted metadata file that is in the format of the document management system; and
   storing the converted metadata file in the memory.

4. The computer-implemented method of claim 3, wherein the method further comprises:
   receiving additional classification information from the application program; and
   storing the additional classification information in the memory.

5. The computer-implemented method of claim 1, wherein the method further comprises:
   extracting graphics data from the document;
   converting the extracted graphics data into a converted graphics data file that is in the format of the document management system; and
   storing the converted graphics data file for each document in the memory separately from the converted component data file that contains text for the document.

6. The computer-implemented method of claim 1, wherein the method further comprises:
   at the document management system, responsive to a request from a retrieving application program for a document in a requested format, determining if the requested format is the format of the document management system; and
   if the requested format is not the format of the document management system, then:

converting the stored converted component data files corresponding to the requested document into the requested format;

converting the stored access authorization information corresponding to the requested document into the requested format;

combining the converted component data files into an output document; and providing the output document to the retrieving application program, wherein the retrieving application program determines if the request for access is appropriate based on the access authorization information.

7. The computer-implemented method of claim 6, wherein converting the converted component data file into the requested format comprises converting the converted component data file to one of a .doc, .wpd, and .pdf format.

8. A machine-readable medium storing a set of instructions, the set of instructions capable of being executed by a processor to implement a method comprising:

at a document management system, responsive to a request from an application program to store a document, determining if the document is in a format of the document management system;

extracting component data from the document; and if the document is not in the format of the document management system, then:

converting the extracted component data via a plug-in that is specific to the application program into one or more converted component data files that are in the format of the document management system;

converting access authorization information for the document via the plug-in into converted access authorization information that is in the format of the document management system;

storing the converted component data files in a memory; and storing the converted access authorization information in the memory.

9. The machine-readable medium of claim 8, wherein the method further comprises:

extracting metadata from the document;

converting the extracted metadata into a converted metadata file that is in the format of the document management system; and storing the converted metadata file for each document in the memory separately from the converted data file that contains the-text for the document.

10. The machine-readable medium of claim 9, wherein the method further comprises:

receiving additional classification information from the application program; and storing the additional classification information in the memory separately from the converted component data file that contains the-text for the document.

11. The machine-readable medium of claim 10, wherein the method further comprises:

extracting graphics data from the document;

converting the extracted graphics data into a converted graphics data file that is in the format of the document management system; and storing the converted graphics data file for each document in the memory separately from the converted component data file that contains the-text for the document.

12. The machine-readable medium of claim 8, wherein the method further comprises:

at the document management system, responsive to receiving a request from a retrieving application program for a document in a requested format, determining if the requested format is the format of the document management system; and if the requested format is not the format of the document management system, then:

converting the stored converted component data files corresponding to the requested document into the requested format;

converting the stored access authorization information corresponding to the requested document into the requested format;

combining the converted component data files into an output document; and providing the output document to the retrieving application program, wherein the retrieving application program determines if the request for access is appropriate based on the access authorization information.

13. A computer-implemented method comprising:

at a document management system, responsive to a request from an application program to retrieve a document in a specified format, determining if the specified format is a format of the document management system; and if the specified format is not the format of the document management system, then:

retrieving one or more component data files corresponding to the requested document from a memory;

retrieving access authorization information for the component data files from the memory;

converting the component data files to the specified format;

converting the access authorization information to the specified format;

combining the converted component data files into an output document;

providing the output document and the access authorization information to the application program, wherein the application program determines if the request for access is appropriate based on the access authorization information.

14. The computer-implemented method of claim 13, wherein providing the requested document to the first application program further comprises:

retrieving from the memory a metadata file corresponding to the requested document;

converting the retrieved metadata file to the specified format; and combining the converted metadata file into the output document.

15. The computer-implemented method of claim 13, wherein providing the requested document to the first application program further comprises:

retrieving from the memory a graphics data file corresponding to the requested document;

converting the retrieved graphics data file to the specified format; and combining the converted graphics file into the output document.

16. The computer-implemented method of claim 13, wherein the method further comprises:

at the document management system, responsive to a request from a second application program to store a second document, determining if the second document is in the format of the document management system;

extracting component data from the second document; and if the second document is not in the format of the document management system, then:

converting the extracted component data via a plug-in that is specific to the second application program into one or more converted component data files that are in the format of the document management system;

converting access authorization information for the second document via the plug-in into converted access authorization information that is in the format of the document management system;

storing the converted component data files in the memory; and storing the converted access authorization information in the memory.

17. The computer-implemented method of claim 16, wherein the method further comprises:

extracting metadata from the second document;

converting the extracted metadata via the plug-in into a converted metadata file that is in the format of the document management system; and storing the converted metadata file in the memory.

18. The computer-implemented method of claim 17, wherein the method further comprises:

receiving additional classification information from the second application program; and storing the additional classification information in the memory.

19. A machine-readable medium storing a set of instructions, the set of instructions capable of being executed by a processor to implement a method comprising:

at a document management system, responsive to a request from an application program to retrieve a document in a specified format, determining if the specified format is a format of the document management system; and if the specified format is not the format of the document management system, then:

retrieving one or more component data files corresponding to the requested document from a memory;

retrieving access authorization information for the component data files from the memory;

converting the component data files to the specified format;

converting the access authorization information to the specified format;

combining the converted component data files into an output document; and providing the output document and the access authorization information to the application program, wherein the application program determines if the request for access is appropriate based on the access authorization information.

20. The machine-readable medium of claim 19, wherein providing the requested document to the first application program further comprises:

retrieving from the memory a graphics data file corresponding to the requested document;

converting the retrieved graphics data file to the specified format; and combining the converted graphics file into the output document.

21. The machine-readable medium of claim 19, wherein the method further comprises:

at the document management system, responsive to a request from a second application program to store a second document, determining if the second document is in the format of the document management system;

extracting component data from the second document; and if the second document is not in the format of the document management system, then:

converting the extracted component data via a plug-in that is specific to the second application program into one or more converted component data files that are in the format of the document management system;

converting access authorization information for the second document via the plug-in into converted access authorization information that is in the format of the document management system;

storing the converted component data files in the memory; and storing the converted access authorization information in the memory.

22. The machine-readable medium of claim 21, wherein the method further comprises:

extracting metadata from the second document;

converting the extracted metadata via the plug-in into a converted metadata file that is in the format of the document management system; and storing the converted metadata file in the memory.

23. The machine-readable medium of claim 22, wherein the method further comprises:

receiving additional classification information from the second application program; and storing the additional classification information in the memory.

* * * * *